(12) United States Patent
Turner

(10) Patent No.: US 6,577,275 B2
(45) Date of Patent: Jun. 10, 2003

(54) TRANSACTIONS AND BUSINESS PROCESSES EXECUTED THROUGH WIRELESS GEOLOCATION SYSTEM INFRASTRUCTURE

(75) Inventor: Thomas E. Turner, Winter Springs, FL (US)

(73) Assignee: Wherenet Corp, Santa Clara, CA (US)

( * ) Notice: Subject to any disclaimer, the term of this patent is extended or adjusted under 35 U.S.C. 154(b) by 0 days.

(21) Appl. No.: 09/801,215

(22) Filed: Mar. 7, 2001

(65) Prior Publication Data
US 2001/0024174 A1 Sep. 27, 2001

Related U.S. Application Data
(60) Provisional application No. 60/187,604, filed on Mar. 7, 2000.

(51) Int. Cl.$^7$ ............................ G01S 3/02; G06F 17/60
(52) U.S. Cl. .................. 342/465; 235/385; 342/463; 705/28
(58) Field of Search ............................. 342/463, 465; 705/28; 235/385

(56) References Cited

U.S. PATENT DOCUMENTS

| | | | |
|---|---|---|---|
| 5,842,193 A | 11/1998 | Reilly | 706/45 |
| 5,920,287 A | 7/1999 | Belcher et al. | 342/450 |
| 5,979,757 A * | 11/1999 | Tracy et al. | 235/385 |
| 5,995,046 A | 11/1999 | Belcher et al. | 342/450 |
| 6,105,008 A | 8/2000 | Davis et al. | 705/41 |
| 6,179,206 B1 * | 1/2001 | Matsumori | 235/375 |
| 6,236,335 B1 * | 5/2001 | Goodwin, III | 235/385 |

FOREIGN PATENT DOCUMENTS

WO    WO 01/43087 A1 * 6/2001 ............. G07F/7/10

OTHER PUBLICATIONS

Personal locator services emerge, Koshima, H.; Hoshen, J., IEEE Spectrum, vol. 37(2), p. 41–48, (also available at URL: http://ieeexplore.ieee.org/iel5/6/17780/00819928.pdf), Feb. 2000.*
Personal locator services emerge, Koshima, H.; Hoshen, J., IEEE Spectrum, vol. 37(2), p. 41–48, Feb. 2000.*

* cited by examiner

Primary Examiner—Thomas H. Tarcza
Assistant Examiner—F H Mull
(74) Attorney, Agent, or Firm—Allen, Dyer, Doppelt, Milbrath & Gilchrist, P.A.

(57) ABSTRACT

A tool for augmenting and customizing business transaction processes uses the communication capability and functionality of a geolocation system to embed information associated with a transaction of a tagged object within the spread spectrum signals used to geolocate the object. This enables an ancillary transaction controller, separate from the geolocation system, to focus or target one or more transactions with respect to the tagged object, which may be an individual, such as a customer, patient, client, or the like of an institution in which the geolocation system is installed.

15 Claims, 5 Drawing Sheets

TRANSACTIONS AND BUSINESS PROCESSES EXECUTED THROUGH WIRELESS GEOLOCATION SYSTEM INFRASTRUCTURE

CROSS-REFERENCE TO RELATED APPLICATIONS

The present application claims the benefit of co-pending U.S. Provisional Patent Application, Serial No. 60/187,604 filed Mar. 7, 2000, by Thomas E. Turner, entitled: "Transactions and Business Processes Enabled by Geo-Location Technology," assigned to the assignee of the present application and the disclosure of which is incorporated herein.

FIELD OF THE INVENTION

The present invention relates in general to the application to a variety of transaction and business processes of the communication mechanism and geolocation functionality employed in a radio-tagged object location and tracking system of the type described in the U.S. Patents to Belcher et al, U.S. Pat. Nos. 5,920,287 and 5,995,046, (hereinafter referred to as the '287 and '046 patents, respectively), assigned to the assignee of the present application and the disclosures of which are incorporated herein.

The invention is particularly directed to the use of the spread spectrum communication and geolocation functionality of the patented system to both convey information associated with a transaction of a tagged object and to allow the site of the object conducting the transaction to be geolocated. This dual functionality allows an ancillary transaction controller to interactively focus or target one or more additional transactions with respect to the tagged object, which may be an individual, such as a customer, patient, client, or the like of an institution (e.g., retailer, hospital, etc.) in which the geolocation system is installed.

BACKGROUND OF THE INVENTION

The general architecture of the radio tagged object geolocation systems described in the above-referenced '287 and '046 Patents is diagrammatically shown in FIG. 1 as comprising a plurality of tag emission readers 10 that are installed at precisely geographically known and relatively unobtrusive locations in and/or around the perimeter of an asset management environment 12. The asset management environment contains a plurality of objects/assets 14, to which radio-containing 'tags' 16 are affixed.

As a result of radio emissions from the tags 16, the locations of the objects 14 can be monitored on what is effectively a continuous basis by the readers 10 and reported to an asset management database 20. This database may be accessed by way of a digital computer workstation or personal computer 26. Advantageously, the tag-to-system infrastructure communication reliability of the geolocation system of the '287 and '640 patents is inherently very high, as the readers are spatially distributed to ensure that a transmission from any tag will always be received by at least three and preferably four readers.

In order that the system may locate and track the objects, the system employs a spread spectrum wireless communication infrastructure between the tags and the readers. In this communication infrastructure, each radio tag 16 is operative to repeatedly transmit or 'blink' a short duration, wideband (spread spectrum) pulse of RF energy. This RF pulse is encoded with the identification of its associated object and ancillary information stored in a tag memory.

These short duration spread spectrum emissions from a tag are detected by the tag emission readers 10, outputs of which are coupled to an associated reader output processor of an RF processing system 24. This processor correlates the spread spectrum signals received from a tag with a set of spread spectrum reference signal patterns, in order to determine which spread spectrum signals received by the reader is a first-to-arrive spread spectrum signal burst transmitted from a tag. The first-to-arrive signals are then coupled to an object geolocation processor, which performs time-of-arrival differentiation of the detected first-to-arrive transmissions, to geolocate (within a prescribed spatial resolution, e.g., on the order of ten feet) the tagged object of interest.

SUMMARY OF THE INVENTION

As pointed out above, and as described in detail in the '046 and '287 applications, whenever a tag blinks, it transmits a burst of spread spectrum RF energy that is encoded with the identification of the tagged object and also ancillary information stored in a tag memory. The tag memory may also store parameter data provided by an auxiliary device, such as a transducer or sensor associated with the object of interest (for example a temperature sensor coupled directly to the tag), or it may receive data downloaded to the tag from another device, such as a wireless interrogating unit. This ability of the tag to incorporate auxiliary information into the tag's wireless communication (spread spectrum RF burst) to the geolocation infrastructure makes the patented geolocation system a very powerful tool for augmenting and customizing a variety of business transactions and processes.

Pursuant to a first embodiment, a geolocation radio tag-based communication link is established between the geolocation system and an ancillary (portable) computing device. The computing device is interfaced as an auxiliary input to the radio tag, so as to enable the spread spectrum transmission mechanism of the tag radio to be used to transmit transaction data associated with the operation of the computing device to the geolocation infrastructure, as well as geolocating the tag (and thereby the computing device).

In accordance with a second embodiment, the scanning of barcode information is combined with the real-time location functionality of the geolocation system. This is very practical for inventory, as it enables the identity of an item to be coupled with its location. The barcode information is coupled as an auxiliary data input to the geolocation systems radio tag for storage in tag memory, while operation of the barcode scanning device may be an auxiliary trigger input to the transmitter circuitry of the radio tag. This allows scanned barcode information to be wirelessly conveyed to the user's information system, together with the location of the scan event as determined by the geolocation system, as the time of the occurrence of the scan event.

A third embodiment combines the identification and operation of a digital camera with the real-time location functionality of the geolocation system. The identification of the digital camera is stored in the tag memory, while the image capture operation of the camera (photo number) is auxiliary data to the tag memory. Activation of the camera is supplied as a transmission activation input to the tag radio. As a consequence, at the taking of the "snapshot", the geolocation tag-augmented digital camera causes the transmission of a camera identification signal to the readers of the geolocation system. This enables the location of the camera to be correlated with its captured image to be readily identified at the time of the photograph is taken.

In a fourth embodiment, a geolocation radio tag is worn by an individual within a 'sectorized' paging system environment, comprised of a plurality of addressable paging cells each of which contains one or more paging speaker units. In this embodiment, the ability of the associated geolocation system to locate the person to be paged allows a paging system operator to deliver a page from only that particular cell in which the person is located. This not only reduces technical difficulties in executing the page, but reduces the range requirements and paging load.

A fifth embodiment has the geolocation system installed in a retail establishment equipped with one or more electronic messaging units distributed throughout the store for advertising, emergency information, etc. Upon entering the store, the customer is issued a 'tracking' tag, memory of which has been loaded with customer identification information. This allows the store's geolocation system to track the customer, and provides a key to a customer associated database. Using this database, and knowledge of the customer's whereabouts, the electronic messaging subsystem may be used to issue customer-specific advertising messages, when the customer enters a specific area containing products for which the database indicates a customer interest or preference.

In a sixth embodiment, a customer with a shopping cart is provided with a portable scanning device equipped with a geolocation radio tag that allows a shopper to scan an item and wirelessly execute a sales transaction with a remote point of sales terminal, that is linked to the geolocation system. The sales transaction may be completed by means of the shopper's credit card or in accordance with a previously arranged account. Thus, the wireless link provides both the sales transaction data and the location where the item is purchased.

As an adjunct, the customer's shopping cart may be equipped with its own geolocation radio tag. When the shopper enters the store and procures a shopping cart, the customer scans in identification data into the cart-mounted radio tag, so that the cart and its radio tag now become associated with a specific shopper. The location of the cart and its tag are continuously monitored by the store's geolocation system. This allows an electronic messaging subsystem to issue customer-specific advertising messages, when the customer enters a specific area containing products for which the database indicates a customer interest or preference. It also allows customer sales transactions to be fully automated using a wireless scanner and the geolocation system.

BRIEF DESCRIPTION OF THE DRAWINGS

FIG. 6 shows a fifth embodiment of the invention, in which a geolocation system installed in a retail establishment is used to track customers and selectively control the operation of messaging units for advertizing, emergency information, and the like.

DETAILED DESCRIPTION

Before describing the present invention in detail, it should be observed that the invention primarily involves the manner in which a radio tagged object geolocation system of the type described in the above-referenced '287 and '046 Patents may be used to augment a variety of processes and business transactions. The architecture of the patented geolocation system remains essentially the same. What is added by the invention is the interfacing of the radio tag to an existing ancillary utility device, such as a personal digital assistant (PDA), audio, video or data device, and the like, that allows the infrastructure of the geolocation system to convey both the data sourced from and the determined location of that utility device to a transaction controller of an auxiliary system in which the utility device is employed. This serves to facilitate the auxiliary system interactively focusing or targeting one or more additional transactions with respect to the tagged object, which may be an individual, such as a customer, patient, client, or the like of an institution (e.g., retailer, hospital, etc.) where the geolocation system is installed.

The invention has therefore been illustrated in readily understandable block diagram format, depicting only those details that are pertinent to an understanding of the same, so as not to obscure the disclosure with details which will be readily apparent to those skilled in the art having the benefit of the description herein. Thus, the block diagram illustrations are primarily intended to show the major components of the tag-based geolocation system of the '046 and '287 geolocation system as applied to various transaction processes in a convenient functional grouping, whereby the present invention may be more readily understood.

Figure 2:
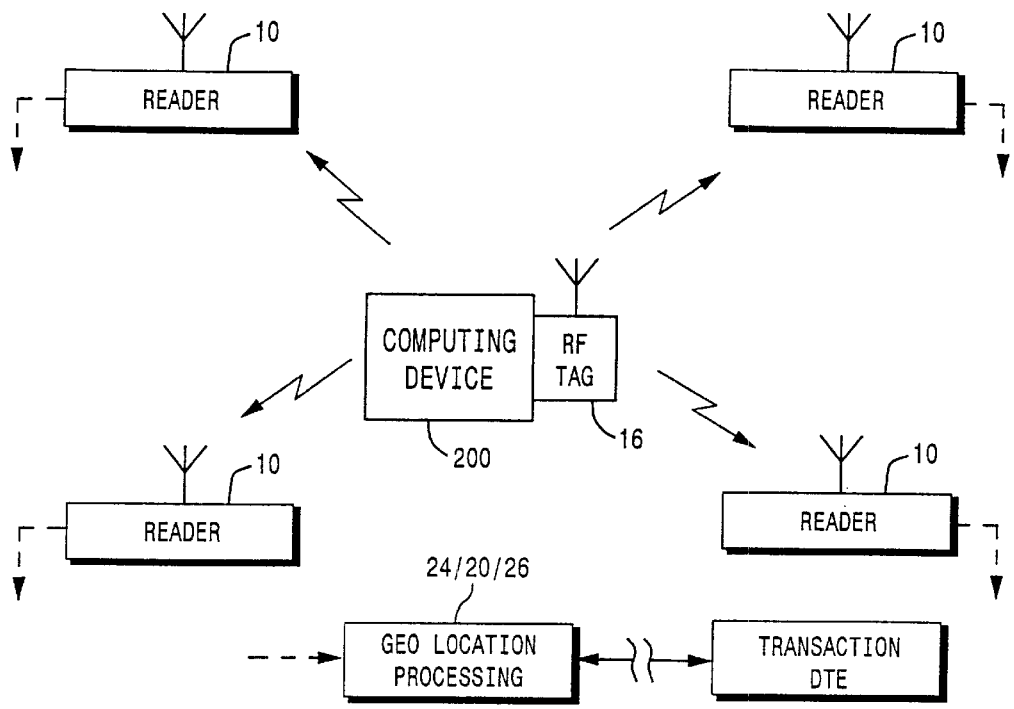
FIG. 2 shows a first embodiment of the invention, in which data transport and location of a transaction carried out by an ancillary computer device are electronically performed by a geolocation system.

Attention is now directed to FIG. 2, which shows a first embodiment of the invention, in which a geolocation radio tag-based communication link between a computing device 200 and the readers of the infrastructure of the patented system allows the location of a given transaction carried out by the use of the device 200 to be electronically determined on a real time basis, by the geolocation system and thereby incorporated into the data processing associated with the user's transaction application. As a non-limiting example, the computing device may comprise a mobile or fixed computing device 200, such as a personal computer, PDA, and the like.

Figure 1:
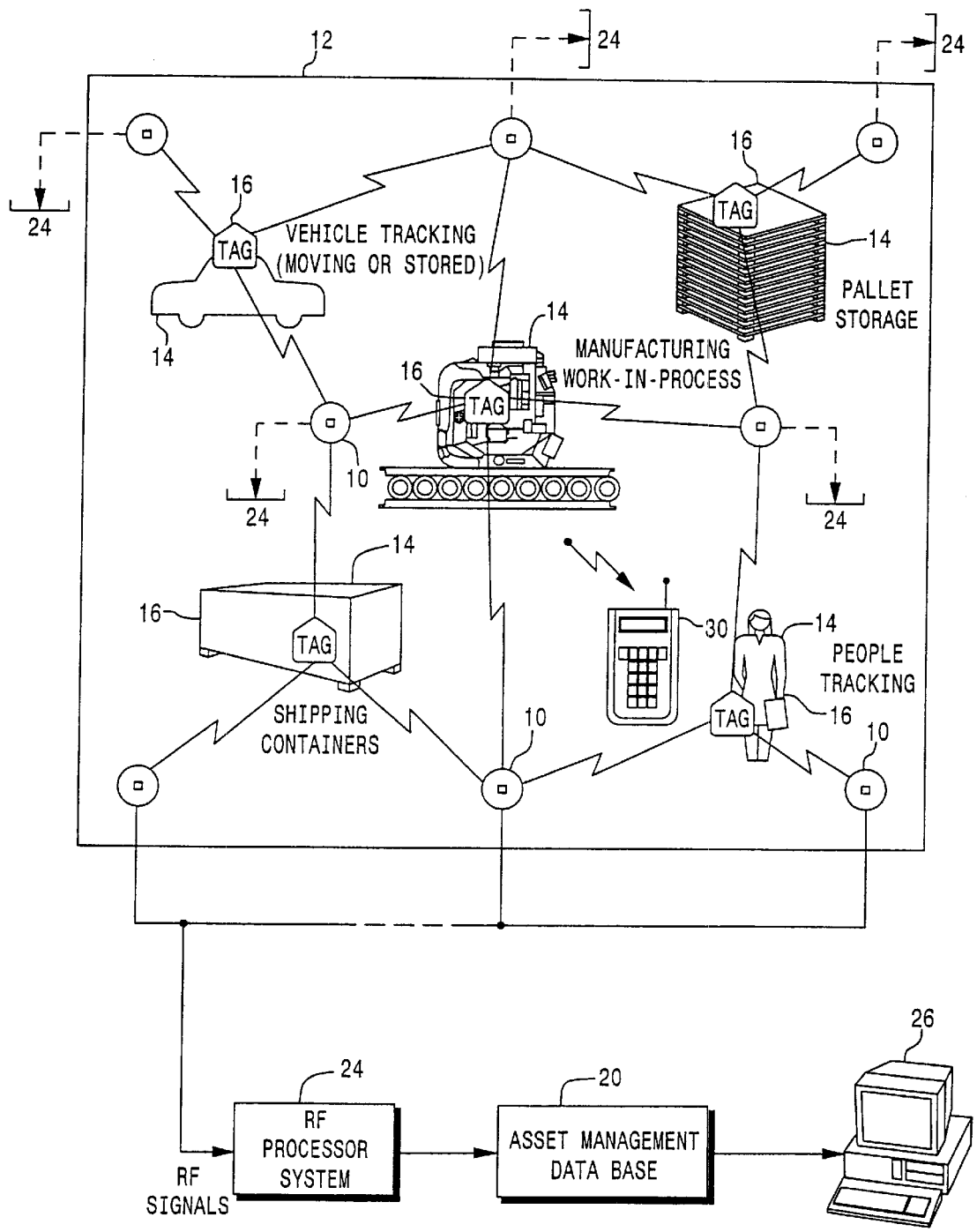
FIG. 1 diagrammatically illustrates the general architecture of the radio tagged object geolocation systems described in the above-referenced '287 and '046 Patents.

The computing device 200 corresponds to a respective 'object' 14 within the monitored asset management environment 12 of the geolocation system of FIG. 1. The wireless communication device with which the computing device 200 is interfaced is the circuitry of an associated radio tag 16 attached to the object 14 (here computing device 200). This interfacing of the computing device as an auxiliary input to the tag enables the spread spectrum transmission mechanism of the tag radio to be used to transmit transaction data associated with the operation of the computing device to the geolocation infrastructure, as well as geolocating the tag (and thereby the computing device 200).

Since, as shown in FIG. 1, the asset management database 20 of the geolocation system's infrastructure may be interfaced with digital computer workstation, personal computer, or the like, shown at 26 in FIG. 1, what results is an inter-computing terminal link between the computing device 200 and external data terminal equipment (DTE) (the computer 26 or another DTE coupled to computer 26) associated with the use of the computing device for a given transaction.

Figure 3:
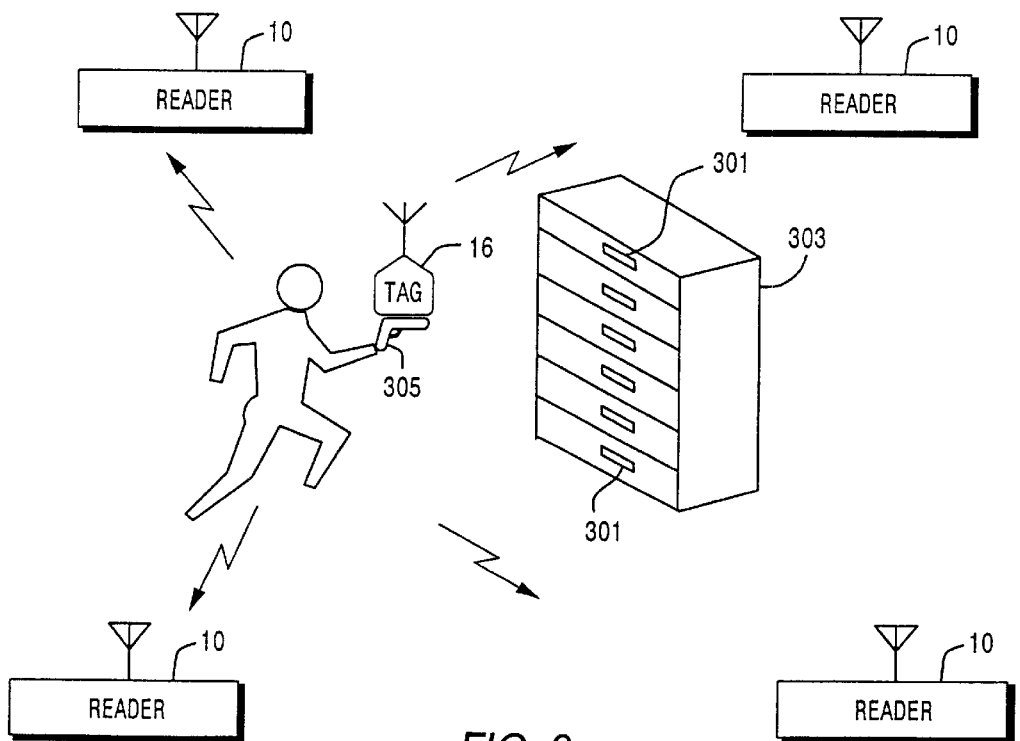
FIG. 3 shows a second embodiment of the invention, in which scanning of barcode information is combined with the location functionality of a geolocation system.

FIG. 3 shows a second embodiment of the invention, in which the scanning of barcode information is combined with the real-time location functionality of the geolocation system. This barcode application of the geolocation system is very practical for inventory, as it enables the barcode (identity) of an item to be coupled with its location. In this embodiment, barcode information, such as that displayed on a respective barcode label 301 of an item storage facility 303 and scanned by a barcode scanning device 305, is coupled as an auxiliary data input to the radio tag 16, for storage in tag memory as described above. The operation of the barcode scanning device 305 is coupled as an auxiliary trigger input to the transmitter circuitry of the radio tag 16. This enables the scanned barcode information to be (wirelessly) conveyed to the user's information system along with the location of the "scan event" as determined by the geolocation system, as the time of the occurrence of the scanning event.

Figure 4:
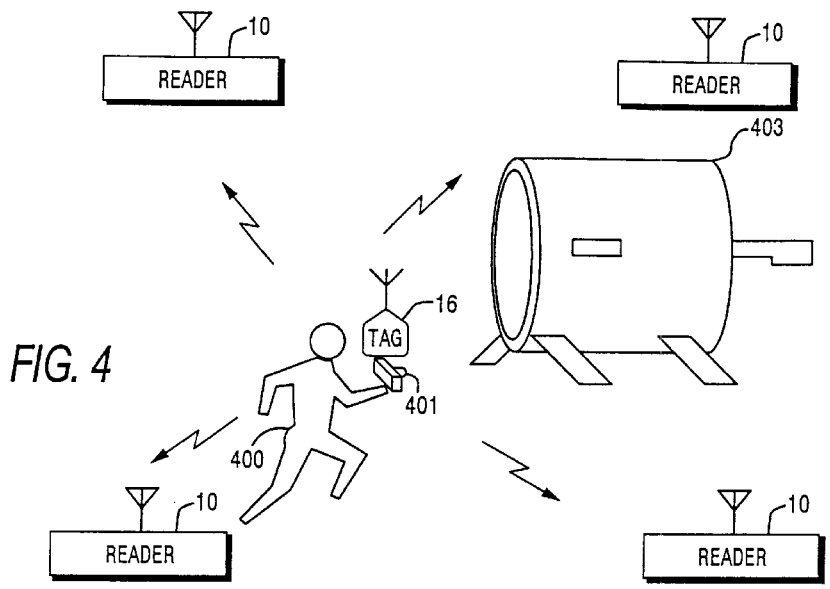
FIG. 4 shows a third embodiment of the invention, in which operation of a digital camera is combined with the location functionality of a geolocation system.

FIG. 4 shows a third embodiment of the invention, in which the identification and operation of a digital camera (as the tagged object) is combined with the real-time location functionality of the geolocation system. As a non-limiting example, a user 400 is shown as using the digital camera 401 to capture a digital image of an electric motor 403 in an industrial facility. In this example, the identification of the digital camera is stored as the object identification information in the tag memory, while the image capture operation of the camera (photo number) is used as an auxiliary data input to the tag memory. Activation of the camera is supplied as a transmission activation input to the tag radio. Therefore, at the moment of the taking of the "snapshot", the geolocation tag-augmented digital camera causes the transmission of a camera identification signal to the readers of the geolocation system. This enables the location of the camera to be correlated with its captured image to be readily identified at the time of the photograph is taken.

Figure 5:
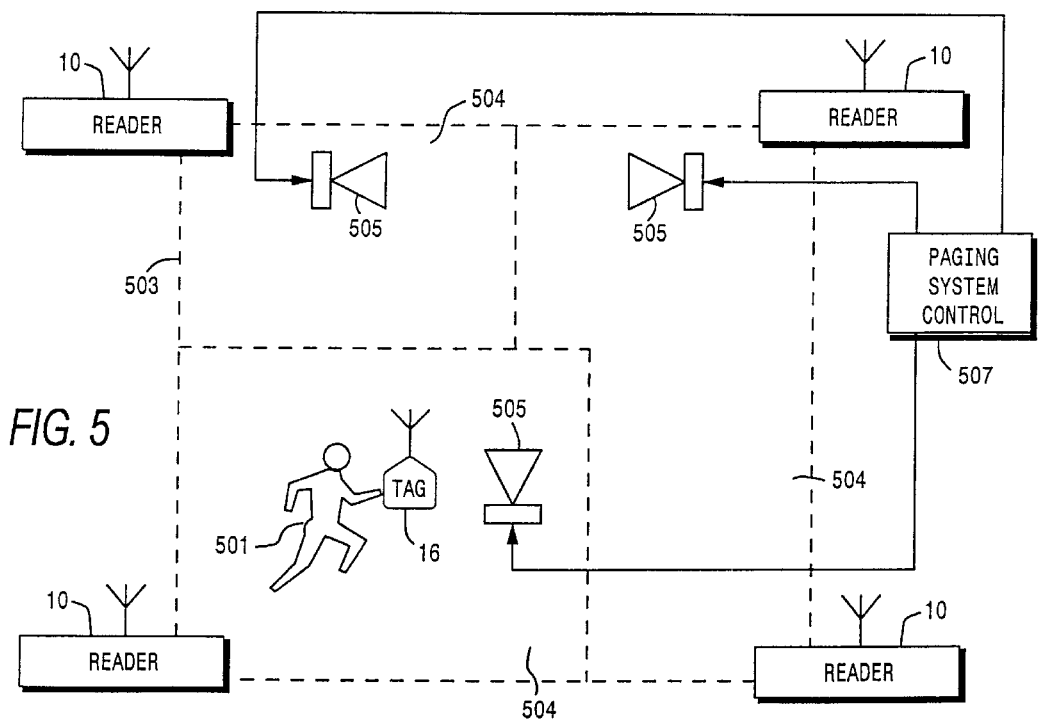
FIG. 5 shows a fourth embodiment of the invention, in which a geolocation radio tag worn by an individual is used to focus the operation of a paging system to a sector in which the individual is located.

FIG. 5 shows a fourth embodiment of the invention, in which a geolocation radio tag 16 is worn by an individual 501 within a 'sectorized' paging system environment 503, for which geolocation coverage is provided by an associated geolocation system of the type described above with reference to FIG. 1 is provided. By sectorized paging system is meant a paging system comprised of a plurality of individually addressable paging cells 504, each of which contains one or more paging speaker units 505. In this embodiment, the ability of the associated geolocation system to locate the person to be paged allows a paging system operator at a paging system control console 507 to deliver a page from only that particular cell 504 in which the person is located. This not only reduces technical difficulties in executing the page, but reduces the range requirements and paging load.

Such targeted paging is particularly useful in a relatively densely populated facility that may be 'audio-contaminated' with constant paging of individuals. A non-limiting example of such a facility is a hospital, where paging can be distracting and disturbing to patients. Enabling the operator of the hospital's paging system to know the location of the specific individual (e.g., doctor) to be paged, allows the page to be selectively generated in only an area immediate to the individual, thus greatly reducing the paging traffic.

Figure 6:
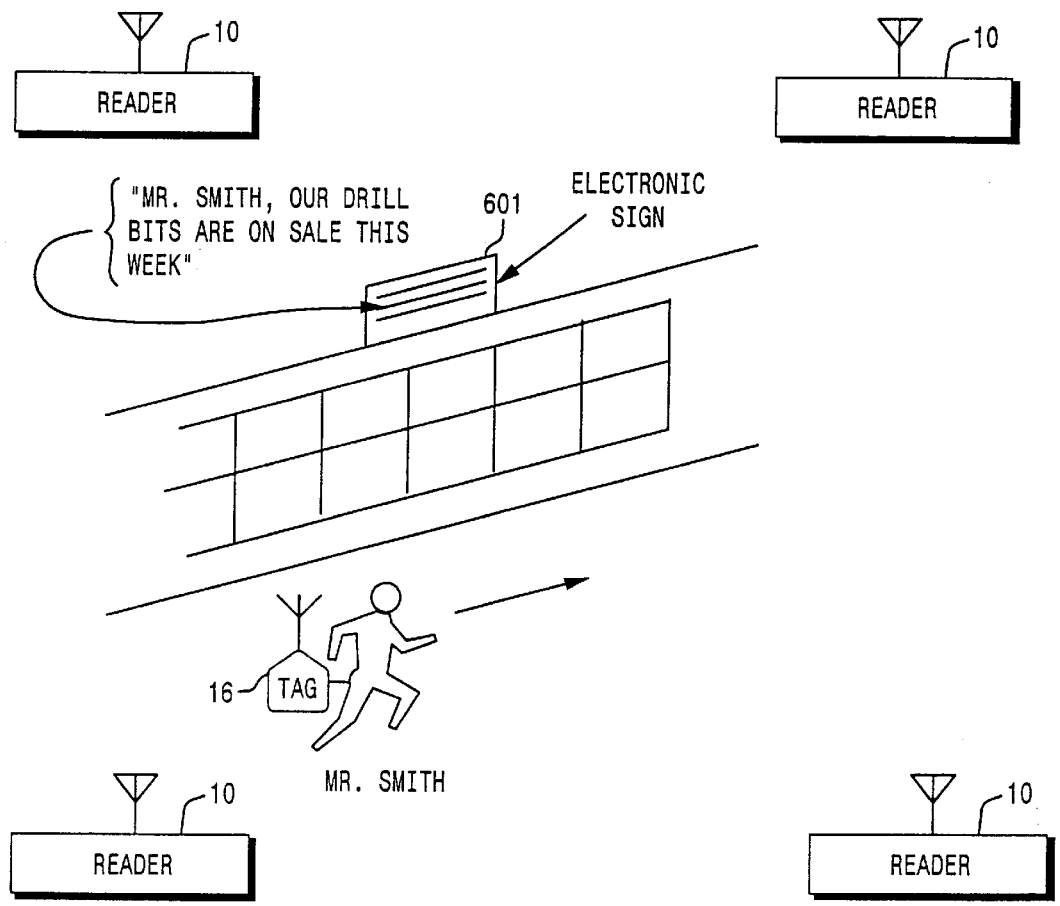

FIG. 6 shows a fifth embodiment of the invention, in which the geolocation system of the type described above with reference to FIG. 1 is installed in a retail establishment, equipped with one or more electronic messaging units or signs (e.g., 'digital radios') 601 that may be distributed throughout the store for advertising, emergency information, etc. Pursuant to this embodiment, upon entering the store, the customer (identified as a "Mr. Smith") is issued a 'tracking' tag, memory of which has been loaded with customer identification information.

Not only does this allow the store's geolocation system to track the customer in the store, but it provides a key to a customer associated database, such as one containing the customer's purchasing profile stored in the workstation. Using this database, and knowledge of the customer's whereabouts, the electronic messaging subsystem may be used to issue customer-specific advertising messages, when the customer enters a specific area containing products for which the database indicates a customer interest or preference.

Figure 7:
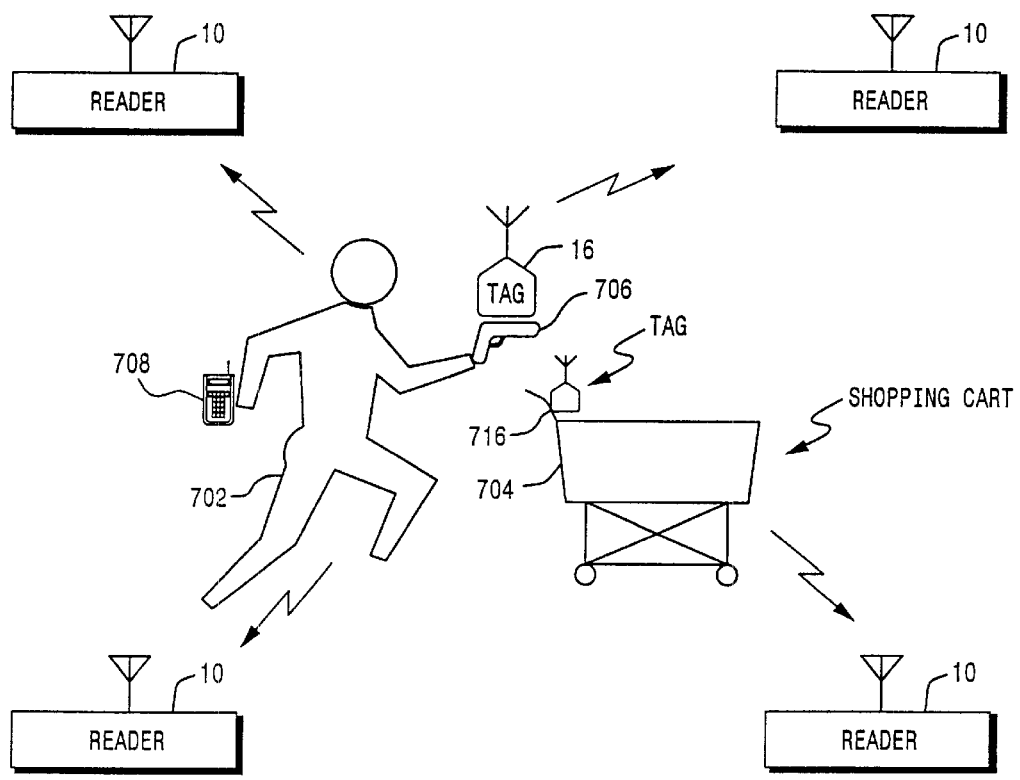
FIG. 7 shows a sixth embodiment of the invention, in which a geolocation system is used to transport customer location and sales information in a retail establishment, including equipping a customer's shopping cart with a geolocation radio tag.

FIG. 7 shows a sixth embodiment of the invention, in which the geolocation system of the type described above with reference to FIG. 1 is installed in a retail establishment. In this embodiment, a customer 702 with a shopping cart 704 is provided with a portable scanning device 706 that allows a shopper to scan an item 708 and wirelessly execute a sales transaction with a remote point of sales terminal, that is linked to the geolocation system. Here, the scanning device 706 is equipped with a geolocation radio tag 16. (As a non-limiting alternative, the device 706 may comprise a self-contained point-of-sales communication device, such as a personal digital assistant, equipped with a geolocation tag, that allows a shopper to communicate purchase information to a remote terminal.) The sales transaction may be completed by means of the shopper's credit card or in accordance with a previously arranged account. Thus, the wireless link provides both the sales transaction data and the location of the event (where the item is purchased).

FIG. 7 also shows a further enhancement, similar to that shown in FIG. 6, in which the customer's shopping cart 704 is equipped with its own geolocation radio tag 716. Pursuant to this enhancement, when the shopper enters the store and procures a shopping cart, the customer scans in identification data into the cart-mounted radio tag, so that the cart and its radio tag now become associated with a specific shopper. The location of the cart and its tag are continuously monitored by the store's geolocation system.

Similar to the embodiment of FIG. 6, this allows an electronic messaging subsystem to issue customer-specific advertising messages, when the customer enters a specific area containing products for which the database indicates a customer interest or preference. Thus, the combined features of the embodiment of FIG. 7 allow customer sales transactions to be fully automated using a wireless scanner and the geolocation system, as described above.

The attachment of a radio tag to the shopping cart also provides a number of benefits to the establishment. For example, the ability of the geolocation system to continuously track the whereabouts of the shopping carts, allows alerts to be generated to the store's management, if too many shopping carts were found to be left outside and needed to be returned. Similarly, it enables an alert to be issued, if too many shopping carts are detected to be accumulating in a particular area of the store, or of particular importance, should too many shopping carts be detected to be nearing completion of their average visit time and the store requires more cashiers to the checkout lanes. Moreover, tracking shopping carts is also an indication of the statistics of the paths (routes) taken by shoppers, which enables management personnel to distribute merchandise and marketing more effectively.

As will be appreciated from the foregoing description, the use of the spread spectrum communication and geolocation functionality of a geolocation system of the type described in the '046 and '287 patents, to convey information associated with a transaction of a tagged object and to geolocate the site of the object provides a very powerful tool for augmenting and customizing a variety of business transaction processes (such as sales and shopper preferences in a retail establishment). This augmentation enables an ancillary transaction controller to (interactively) focus or target one or more transactions with respect to the tagged object, which may be an individual, such as a customer, patient, client, or the like of an institution (e.g., retailer, hospital, etc.) in which the geolocation system is installed.

While I have shown and described various embodiments of the present invention, it is to be understood that the same is not limited thereto but is susceptible to numerous changes and modifications as known to a person skilled in the art, and I therefore do not wish to be limited to the details shown and described herein, but intend to cover all such changes and modifications as are obvious to one of ordinary skill in the art.

What is claimed:

1. A method of operating a portable computing device that is operative to execute an application program stored therein and to wirelessly communicate with data terminal equipment at a remote site with respect to execution of said application program, said method comprising the steps of:
   (a) coupling said portable computing device as an auxiliary data input to a wireless emission tag that is operative to generate wireless spread spectrum emissions monitored at a plurality of spaced apart tag emission readers of a geolocation system, outputs of said tag emission readers being processed to geolocate said tag and thereby said portable computing device by detecting first-to-arrive spread spectrum emissions and performing time-of-arrival differentiation of the detected first-to-arrive emissions;
   (b) incorporating transaction data generated by said portable computing device in association with its execution of said application program into said wireless emissions from said wireless emission tag; and
   (c) coupling said transaction data from said geolocation system to said data terminal equipment at said remote site.

2. A method of operating an encoded information scanning device, that is operative to read encoded information and to wirelessly communicate data associated with the scanned encoded information with data terminal equipment at a remote site, said method comprising the steps of:
   (a) coupling said scanning device as an auxiliary data input to a wireless emission tag that is operative to generate wireless spread spectrum emissions monitored at a plurality of spaced apart tag emission readers of a geolocation system, outputs of said tag emission readers being processed to geolocate said tag and thereby said scanning device by detecting first-to-arrive spread spectrum emissions and performing time-of-arrival differentiation of the detected first-to-arrive emissions;
   (b) incorporating said data associated with the scanned encoded information scanned by said scanning device into said wireless emissions from said wireless emission tag; and
   (c) coupling said data associated with the scanned encoded information from said geolocation system to said data terminal equipment at said remote site.

3. The method according to claim 2, wherein said encode information representative data is associated with a sales transaction processed by said data terminal equipment at said remote site.

4. A method of operating a digital camera, that is operative to capture an image of a subject and to wirelessly communicate data associated with the captured image with data terminal equipment at a remote site, said method comprising the steps of:
   (a) coupling said digital camera as an auxiliary data input to a wireless emission tag that is operative to generate wireless spread spectrum emissions monitored at a plurality of spaced apart tag emission readers of a geolocation system, outputs of said tag emission readers being processed to geolocate said tag and thereby said camera by detecting first-to-arrive spread spectrum emissions and performing time-of-arrival differentiation of the detected first-to-arrive emissions;
   (b) incorporating said data associated with the operation of said digital camera into said wireless emissions from said wireless emission tag; and
   (c) coupling said data associated with the operation of said digital camera from said geolocation system to said data terminal equipment at said remote site.

5. A method of operating a paging system of a facility comprising the steps of:
   (a) providing individuals who may be paged by said paging system comprising a plurality of individually addressable paging cells, each of which contains one or more paging speaker units interfaced as an auxiliary data input with wireless emission tags that are operative to generate wireless spread spectrum emissions monitored at a plurality of spaced apart tag emission readers of a geolocation system installed at said facility, outputs of said tag emission readers being processed to geolocate said tags and thereby said individuals by detecting first-to-arrive spread spectrum emissions and performing time-of-arrival differentiation of the detected first-to-arrive emissions; and
   (b) causing a page to be delivered to a paging speaker unit of an individual from a limited portion of said paging system in which said individual has been geolocated in step (a).

6. A method of operating one or more information presentation devices of an electronic messaging system of a facility in which an individual may conduct a transaction using a wireless scanning device, the electronic messaging system having a customer associated database, including a purchasing profile of a customer comprising the steps of:
   (a) coupling a wireless scanning device as an auxiliary data input to a wireless emission tag that is operative to generate spread spectrum wireless emissions monitored at a plurality of spaced apart tag emission readers of a geolocation system installed at said facility, outputs of said tag emission readers being processed to geolocate said tag and wireless scanning device and thereby said individual by detecting first-to-arrive spread spectrum emissions and performing time-of-arrival differentiation of the detected first-to-arrive emissions;
   (b) controllably operating an information presentation device of said electronic messaging system that is proximate to an area of said facility in which said individual has been geolocated in step (a) to display information based on the customer associated database; and (c) scanning data into the wireless scanning device for customer identification such that the wireless emission tag is identified with a customer and incorporating transaction data generated by scanning items with the wireless scanning device into the wireless emissions for completing customer transaction in the facility.

7. The method according to claim 6, wherein said facility comprises a sales establishment and said wireless emission tag is installed on a shopping cart of said sales establishment.

8. The method according to claim 6, wherein said facility comprises a sales establishment, and step (a) includes coupling said wireless emission tag with an encoded information scanning device that is operative to read encoded information associated with the purchase of an item, and to wirelessly communicate data associated with the scanned encoded information with sales transaction terminal equipment coupled to said geolocation system.

9. A communication system for use with a portable computing device, that is adapted to execute an application program stored therein, and being operative to enable said portable computing device to wirelessly communicate data associated with execution of said application program with data terminal equipment at a remote site, said communication system comprising:

a wireless emission tag coupled to said portable computing device to receive data from the portable computing device as an auxiliary data input and being operative to generate wireless spread spectrum emissions that contain transaction data generated by said portable computing device in association with its execution of said application program; and a geolocation system containing a plurality of spaced apart tag emission readers that monitor said wireless emissions, outputs of said tag emission readers being processed to geolocate said tag and thereby said portable computing device by detecting first-to-arrive spread spectrum emissions and performing time-of-arrival differentiation of the detected first-to-arrive emissions, and wherein said transaction data contained in said wireless emissions as monitored by said geolocation system is coupled to said data terminal equipment at said remote site.

10. A communication system for use with an encoded information scanning device that is adapted to read encoded information, and being operative to enable said encoded information scanning device to wirelessly communicate data associated with the scanned encoded information with data terminal equipment at a remote site, said communication system comprising:

a wireless emission tag coupled to said encoded information scanning device to receive data from the portable computing device as an auxiliary data input and being operative to generate wireless spread spectrum emissions that contain data generated by said encoded information scanning device; and a geolocation system containing a plurality of spaced apart tag emission readers that monitor said wireless emissions, outputs of said tag emission readers being processed to geolocate said tag and thereby said encoded information scanning device by detecting first-to-arrive spread spectrum emissions and performing time-of-arrival differentiation of the detected first-to-arrive emissions, and wherein said data contained in said wireless emissions as monitored by said geolocation system is coupled to said data terminal equipment at said remote site.

11. The communication system according to claim 10, wherein said encoded information representative data is associated with a sales transaction processed by said data terminal equipment at said remote site.

12. A method of operating a portable computing device that is operative to execute an application program stored therein and to wirelessly communicate with data terminal equipment at a remote site with respect to execution of said application program, said method comprising:

(a) providing said portable computing device as an auxiliary data input to a wireless emission tag function that is operative to generate wireless spread spectrum emissions monitored at a plurality of spaced apart tag emission readers of a geolocation system, outputs of said tag emission readers being processed to geolocate said portable computing device by detecting first-to-arrive spread spectrum emissions and performing time-of-arrival differentiation of the detected first-to-arrive emissions;

(b) incorporating transaction data generated by said portable computing device in association with its execution of said application program into said wireless emissions; and (c) coupling said transaction data from said geolocation system to said data terminal equipment at said remote site.

13. A method of operating an encoded information scanning device, that is operative to read encoded information and to wirelessly communicate data associated with the scanned encoded information with data terminal equipment at a remote site, said method comprising:

(a) providing said scanning device with a wireless emission tag function to receive data from the scanning device as an auxiliary data input and that is operative to generate wireless spread spectrum emissions monitored at a plurality of spaced apart tag emission readers of a geolocation system, outputs of said tag emission readers being processed to geolocate said scanning device by detecting first-to-arrive spread spectrum emissions and performing time-of-arrival differentiation of the detected first-to-arrive emissions;

(b) incorporating said data associated with the scanned encoded information scanned by said scanning device into said wireless emissions; and (c) coupling said data associated with the scanned encoded information from said geolocation system to said data terminal equipment at said remote site.

14. The method according to claim 13, wherein said encoded information representative data is associated with a sales transaction processed at said data terminal equipment at said remote site.

15. A method of operating a digital camera, that is operative to capture an image of a subject and to wirelessly communicate data associated with the captured image with data terminal equipment at a remote site, said method comprising:

(a) providing said digital camera with a wireless emission tag to receive data from the digital camera as an auxiliary data input that is operative to generate wireless spread spectrum emissions monitored at a plurality of spaced apart tag emission readers of a geolocation system, outputs of said tag emission readers being processed to geolocate said tag and thereby said camera by detecting first-to-arrive spread spectrum emissions and performing time-of-arrival differentiation of the detected first-to-arrive emissions;

(b) incorporating said data associated with the operation of said digital camera into said wireless emissions; and (c) coupling said data associated with the operation of said digital camera from said geolocation system to said data terminal equipment at said remote site.

* * * * *